3,234,239
DIBENZOSTANNOLE COMPOUNDS
Francis Johnson, West Newton, Mass., assignor to The Dow Chemical Company, Midland, Mich., a corporation of Delaware
No Drawing. Filed June 8, 1960, Ser. No. 34,625
8 Claims. (Cl. 260—329)

This invention relates to the preparation of new tin heterocyclic compounds which may be basically characterized as dibenzostannole compounds and to the method for their preparation.

Organo metallic compounds of a variety of structures have been reported and have found an equally varied field of application. In general, they are useful for their thermal stability and related properties. Gilman and Gorsich, J.A.C.S., 77, 6380 (1955), have reported dibenzosilole compounds. Kuivila and Beumel, J.A.C.S., 80, 3250 (1959), have made and reported dibenzostannepin compounds.

It is a basic object of this invention to provide a simple, convenient, rather generalized method of preparing dibenzostannole type compounds wherein reasonable variations in the structure of the compounds can be worked out in the process of synthesis.

The invention, accordingly, is embodied in a new class of compounds which may be generally characterized as having formulas corresponding to the specific formula derivable by reference to the following:

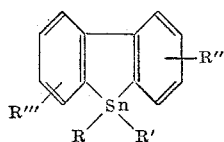

wherein the substituents R and R' may be vinyl groups and alkyl and aryl groups directly connected to the metallic atom; and where R''' and R'' can be alkyl, aryl, methoxyl, dimethylamino, hydroxyl, amino or any groups that would not interfere with ring formation.

The process of preparation involves reacting a diphenyl compound, for example, 2,2'-dibromodiphenyl with butyl lithium (or an alkyl lithium) and a solution of an alkyl tin dihalide or appropriate organo tin halide to produce the compound desired, which compound precipitates from solution and, thereafter, is purified by washing and recrystallization.

The details of the process and the nature of the compound will be better understood by reference to the following specific example illustrating the synthesis:

*Example I.—The preparation of 1,1-dimethyl-2,3,4,5-dibenzostannole*

2,2'-dibromodiphenyl (4 grams) was dissolved in ether (40 milliliters; anhydrous) and to the stirred solution there was added butyl lithium (2 equivalent :0.93N solution) in petrol ether (30 milliliters) during 8 minutes, and the temperature throughout the reaction being maintained at −15°. The mixture was stirred for 4 hours at room temperature, during which period the solution became opaque and pale yellow in color. Finally the solution was refluxed for 0.5 hour. Refluxing was continued and a solution of dimethyl tin dichloride (2.83 grams) in dry ether (40 milliliters) was added slowly during 18 minutes. The turbid solution flocculated initially, then as the latter addition was continued, a sticky solid was deposited. Additional ether (10 milliliters) was added and the solution was stirred and refluxed for 2 hours.

Distilled water (25 milliliters) was added and the organic phase was separated from the aqueous layer. The former was washed with water and set aside. The aqueous layer and washings were combined and extracted with ether (2 x 20 milliliters). This extract was washed once with water (20 milliliters) and the ether extracts then combined and dried over anhydrous sodium sulfate. The ether was removed by distillation at normal pressure and residual organic solvents (butyl bromide and petrol ether) were removed, using a water aspirator. The residue was a pale yellow sticky material containing a highly crystalline solid. It was dissolved in hot ethanol (approximately 18 milliliters) boiled with charcoal for a few minutes and then filtered. After concentrating this solution to 12 milliliters, it was allowed to cool slowly to room temperature. Long prismatic rods were deposited. When crystallization was complete, the solid (1.63 grams) was removed by filtration and washed with a little cold ethanol, then dried by air suction, M.P. 119–122°. One additional crystallization from ethanol gave the pure material as long thick needles, M.P. 123–124°. [Found: C, 55.9; H, 4.8. $C_{14}H_{14}Sn$ requires: C, 55.89; H, 4.69 percent.]

It will be apparent from an inspection of the method of synthesis and the formula of the family of compounds as given above that appropriate selection of substituted starting materials will give the correspondingly substituted dibenzostannole end product. For example, after converting the dibromodiphenyl to the corresponding dimethyl compound, the dilithio compound is reactable with virtually any tin organic dihalide wherein the two halogen atoms react with the dilithiodiphenyl compound to attach themselves thereto and to give the substituted dibenzostannole thus dimethyl, diethyl, dipropyl, dibutyl, dipentyl, diphenyl and divinyl tin chlorides can be used as reactants with an appropriate o,o'-dilithiodiphenyl compound. Likewise other positions on two phenyl rings of the diphenyl compound can be occupied with a variety of substituent groups. That is, the positions which are meta, para, and ortho, respectively, with respect to the junction point of the two phenyl groups in the formation of the diphenyl compound, may be occupied by any of the alkyl, aryl, etc. groups which can be introduced to those positions without materially affecting the steric properties of the compound.

*Example II*

Using the same procedure, but starting with 2,2'-dibromodiphenyloxide, the corresponding tin compound is formed. Likewise, the diphenyl sulfide, sulfite, phosphide or selenide may be used.

Further, with respect to the variants of the diphenyl structure, the formula therefore may be generalized as follows:

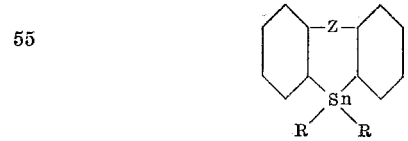

wherein the Z may be entirely absent and the two phenyl rings joined directly at the indicated point, in which case the starting compound is a diphenyl; or the Z may be oxygen, sulfur, sulfonyl, sulfite, and nitrogen group as well as selenium, phosphorus or other organic radical or atom which is not affected by alkyl lithium.

With respect to the further generalization of the metal compound reactant therewith, it may be noted that an o,o'-di Grignard compound can function in place of the dilithio compounds. As the metal halide raw material alkyl tin dichloride, $R_2SnX_2$ in which the R-alkyl group may be any of the alkyl, aryl, aralkyl heterocyclic, alkoxy and virtually any organic substituent, because the reactive portion of this molecule is the halogen which is aimed at the alkali metal in the diphenyl compound.

Employing the same method and selecting the tin halide reactant in accordance with the substituent organo group desired on tin in the ultimate compound, the following compounds are prepared:

In conducting the reaction, due heed must be paid to the fundamental properties of the compounds and in general, relatively mild reaction conditions may be used. That is, temperatures from ambient or about 40° C. to temperatures as low as −80° C. are useful. Virtually any solvent which will hold reactant materials in solution is useful; typical useful solvents are tetrahydrofuran and dibutyl ether. Time of reaction and pressure on the reaction vessel, of course, are not critical variables. In general, since the reaction calls for mol for mol quantities, the reactants are most effective when handled in those quantities.

I have found in general that the reaction proceeds rather easily at temperatures up to 40° or 50° C. and that yields of the order of 45 percent are readily obtainable.

Although the materials are organo metallic compounds of a special class, and as such find particular value as temperature stabilizers and the like in organic fluid compositions, I have found that the compounds are also quite useful as insecticides. Preliminary tests show that the compounds in quite low concentrations will give a 100 percent kill for southern armyworm, bean aphid, two-spotted spider mite, house fly, American cockroach, confused flour beetle, Daphnia, ramshorn snail, northern fat-headed minnows and plum curculio. The compounds are also useful as stabilizers in plastic compositions such as polyvinyl chloride, and for compositions such as insulating oils and transformer oils.

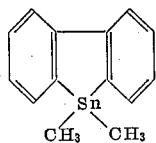
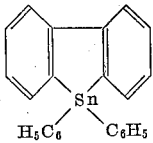

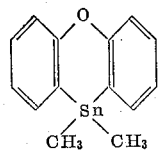
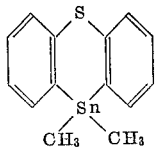

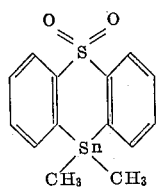

It should be noted that the method of synthesis involves the preparation of the di-phenyl or di-aromatic compound with the ortho substituted lithium thus orienting the lithium so that it is reactable with the halide to give the final compound. The nature of the final compound desired will tell the chemist operator which reactants to use.

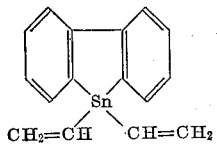
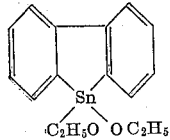

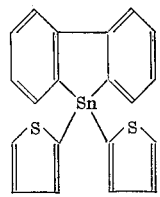
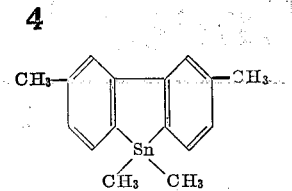

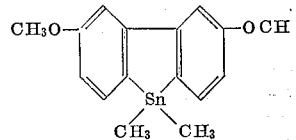

What is claimed is:

1. A stannole compound having a formula given by the following:

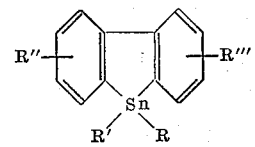

wherein R and R' are independently selected from the group consisting of lower molecular weight alkyl, phenyl, alkylphenyl, heterocyclic and alkoxy moieties, and R" and R''' are independently selected from the group consisting of alkyl, alkoxy, and substituted alkyl and alkoxy groups, said R, R', and R''' groups in the alkyl and heterocyclic portions individually carrying no more than about 6 carbon atoms.

2. A compound corresponding to the following formula:

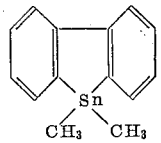

3. A compound corresponding to the following formula:

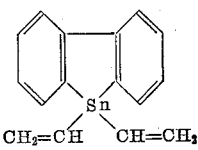

4. A compound corresponding to the following formula:

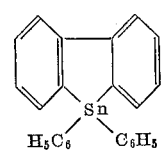

5. A compound corresponding to the following formula:

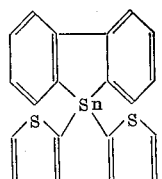

6. A compound corresponding to the following formula:

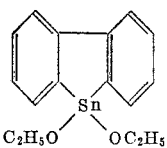

7. A compound corresponding to the following formula:

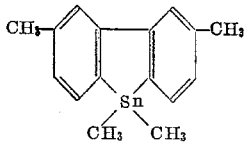

8. A compound corresponding to the following formula:

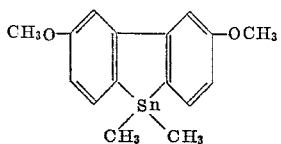

References Cited by the Examiner

UNITED STATES PATENTS 2,980,633  4/1961  Koehler et al. _____ 260—429.7
3,079,414  2/1963  Tamborski et al. __ 260—429.7

OTHER REFERENCES

Gilman et al., "Journal of the American Chemical Society," vol. 77, No. 23, Dec. 5, 1955, pp. 6380–6381 relied on.

Gilman et al., J.A.C.S., 79 (Dec. 5, 1957), pp. 6339–6340.

Henry et al., "Journal of the American Chemical Society," vol. 82, No. 3, Feb. 5, 1960, pp. 561–563 relied on.

Hitchcock et al., J. Chem. Soc. (London), 1957, pp. 4537–4546.

Kuivila et al., "Journal of the American Chemical Society," vol. 80, No. 13, July 1958, pp. 3250–3253 relied on.

Oita et al., J.A.C.S., 79 (January 1957), pp. 339–342.

Patterson et al., "The Ring Index," Reinhold Publishing Corp., 1940, pp. 248 and 249 relied on.

TOBIAS E. LEVOW, *Primary Examiner.*

ABRAHAM H. WINKELSTEIN, *Examiner.*